United States Patent
Nielsen et al.

(10) Patent No.: US 8,615,546 B2
(45) Date of Patent: Dec. 24, 2013

(54) METHOD AND DEVICE FOR IDENTIFYING PATTERNS IN A MESSAGE AND GENERATING AN ACTION

(75) Inventors: Peter Dam Nielsen, Lyngby (DK); Christian Kraft, Fredriksberg C (DK)

(73) Assignee: Nokia Corporation, Espoo (FI)

( * ) Notice: Subject to any disclaimer, the term of this patent is extended or adjusted under 35 U.S.C. 154(b) by 900 days.

(21) Appl. No.: 10/544,594

(22) PCT Filed: Feb. 10, 2003

(86) PCT No.: PCT/IB03/00426
§ 371 (c)(1),
(2), (4) Date: Mar. 11, 2008

(87) PCT Pub. No.: WO2004/071013
PCT Pub. Date: Aug. 19, 2004

(65) Prior Publication Data
US 2006/0212510 A1 Sep. 21, 2006

(51) Int. Cl.
*G06F 15/16* (2006.01)

(52) U.S. Cl.
USPC ........... 709/203; 709/202; 709/204; 709/206; 455/552; 455/553

(58) Field of Classification Search
USPC ............. 709/202–204, 206; 455/552–553
See application file for complete search history.

(56) References Cited

U.S. PATENT DOCUMENTS

| | | | |
|---|---|---|---|
| 5,764,974 A | 6/1998 | Walster et al. | |
| 6,052,382 A | 4/2000 | Burke et al. | 370/466 |
| 6,138,168 A | 10/2000 | Kelly et al. | |
| 6,262,735 B1 | 7/2001 | Etelapera | |
| 6,330,593 B1 * | 12/2001 | Roberts et al. | 709/217 |
| 6,857,008 B1 * | 2/2005 | Shenefiel | 709/219 |
| 6,908,389 B1 * | 6/2005 | Puskala | 463/40 |
| 7,058,565 B2 * | 6/2006 | Gusler et al. | 704/7 |
| 2002/0098831 A1 * | 7/2002 | Castell et al. | 455/413 |
| 2002/0128036 A1 * | 9/2002 | Yach et al. | 455/552 |
| 2002/0165024 A1 * | 11/2002 | Puskala | 463/40 |
| 2003/0220784 A1 * | 11/2003 | Fellenstein et al. | 704/201 |

FOREIGN PATENT DOCUMENTS

| | | |
|---|---|---|
| EP | 0 458 563 A2 | 11/1991 |
| WO | WO-01/22680 A2 | 3/2001 |
| WO | WO 02/089403 A2 | 11/2002 |

* cited by examiner

*Primary Examiner* — Wing F Chan
*Assistant Examiner* — Hitesh Patel
(74) *Attorney, Agent, or Firm* — Alston & Bird LLP (57) ABSTRACT

A method for identifying a pattern in a message and generating an action in a communication terminal, and a communication terminal adapted to identify a pattern in a message and generating an action, aiming at providing actions associated with a received message to enable a user to use a multitude of applications in a communication terminal in a user-friendly way. The communication terminal includes a pattern table including one or more patterns, a parse adapted to parse a message for one or more patterns in the pattern table and adapted to generate a pattern list, an action generator adapted to generate an action including an application all for the application, and a controller adapted to execute the action.

18 Claims, 6 Drawing Sheets

METHOD AND DEVICE FOR IDENTIFYING PATTERNS IN A MESSAGE AND GENERATING AN ACTION

This application is the National Stage of International Application No. PCT/IB2003/000426, International Filing Date, Feb. 10, 2003, which designated the United States of America, and which international application was published under PCT Article 21(2) as WO Publication No. WO 2004/071013 A1.

FIELD OF INVENTION

This invention relates to a method for identifying a pattern in a message and generating an action in a communication terminal, and relates to a communication terminal adapted to identify a pattern in a message and generating an action.

BACKGROUND OF INVENTION

The number of transmissions of messages in a computer or telecommunication network has in the recent years increased significantly. The short message service (SMS) and more recently the multimedia message service (MMS) have become important tools for handling business and common daily routines. Similarly, use of e-mails has accelerated communication between parties as well as expanded the geographical potential of communication between parties separated by great distances.

Lately, communication terminals have evolved to perform, in addition to voice communication, generation and transmission of text messages such as SMS messages as well as MMS messages comprising a video, picture or audio sequence. Furthermore, the communication terminals have evolved to include personal office assistant features such as calendar, address book, or e-mail functions.

Due to the fact that the telecommunication message services and the e-mail services have increased, and that the number of applications to administrate, execute, edit and handle has evolved, the user is required specific knowledge as to how to use them all, especially in combination.

European patent publication no. EP 0 458 563 discloses a radio telephone apparatus which is capable of receiving alphanumeric text messages. The apparatus comprises an internal application capable of processing the text message in such a manner that a telephone number or telephone numbers can be picked out from the rest of the message. Further, the telephone number can be corrected, supplemented, and stored in a memory in the telephone apparatus. It is also possible to place a call to the telephone number picked out from the message.

This feature is well known today and used daily by all mobile phone users. However, it does not fulfil the demands of the great varieties of services that are possible within today's telecommunication networks.

International publication no. WO 01/22680 discloses a method of operating a mobile terminal, wherein it is determined whether a received text message includes text that represents a Uniform Resource Indicator (URI). The mobile terminal comprises launch control logic for identifying an URI in the text, and when the launch control logic identifies an URI, the URI is made selectable, and if the user selects it, an application associated with the URI is invoked. The application can be provided by an external service such as a File Transfer Protocol (FTP) service, a Hypertext Transfer Protocol (http) or telnet scheme for interactive service via the TELNET Protocol.

These features are similar to the features disclosed in EP 0 458 563. However, the International application is generally directed to Internet-type (Wireless Application Protocol) communication instead of ordinary telephone calls.

Present technology provides a user with many features, but also requires the user to have or accumulate knowledge regarding all features of a communication terminal, and know-how to access or utilise these features. Since many users do not know all available applications in their communication terminal, these applications do not provide the user with sufficient added value to their communication.

SUMMARY OF THE INVENTION

An object of the present invention is to overcome the above described problems of the prior art in regards to administrating, executing, editing and handling of numerous of applications.

It is further an object of the present invention to provide a method for seamlessly associating applications to patterns in received messages in a communication terminal.

A particular advantage of the present invention is the provision of an action comprising calls to one or more applications associated with patterns in a received message.

A particular feature of the present invention relates to the provision to the identification of patterns in a message, which patterns associate with parameters for applications identified in the message.

The above objects, advantage and feature together with numerous other objects, advantages and features, which will become evident from below detailed description, are obtained according to a first aspect of the present invention by a method for identifying a pattern in a message and generating an action in a communication terminal comprising:
  (a) parsing said message for one or more patterns in a pattern table and generating a pattern list of one or more identified patterns;
  (b) associating a first pattern in said pattern list with a first application and associating a second pattern in said pattern list with a second application;
  (c) identifying a first parameter for said first application in said pattern list;
  (d) generating an action comprising a first application call for said first application, which first application call comprising said first parameter and a second application call for said second application; and
  (e) executing said action.

The term "first" and "second" should in this context entirely be construed as term for differentiating between two elements and not be construed as a timing consideration.

The present invention is based on the understanding that a communication terminal may be used to carry out a plurality of possible application calls. In a communication terminal, due to different limitations in the user interface, every active measure a user may take will decrease feasibility. This even more since communication terminals are usually operated by one hand. Further, as more applications, e.g. various facilitation programs, are used in communication terminals, the problem with complexity in using the equipment rises. This problem is solved by the present invention.

The method according to the first aspect of the present invention may further comprise enabling a user to select one of the one or more identified patterns in the message as the first pattern. This provides the user an option to indirectly control the generation of the creation of an action.

The method according to the first aspect of the present invention may further comprise generating further actions from the one or more patterns in the message; displaying the actions to a user; and enabling the user to select among the action and the further actions. This is especially advantageous, since the content of a message may associate to a plurality of possible applications or parameters therefore.

The method according to the first aspect of the present invention may further comprise identifying a second parameter for the second application in the pattern list. Any application identified through a recognisable pattern in the message may require a plurality of parameters, which following the identification of the application are sought among the patterns in the pattern list. Thus advantageously the parameters are automatically identified and included in the action.

The method according to the first aspect of the present invention may further comprise assigning a default value to the first and/or second parameter, and/or prompting a user of the communication terminal to assign a value to the first and/or second parameter. Since required parameters are not necessarily encompassed in the pattern list, the user must provide the needed information. This feature improves action generation, and further enables the user to control action generation.

The action according to the first aspect of the present invention may further comprise one or more application calls for internal applications and/or one or more application calls for external applications. The one or more internal applications may comprise a calendar application, a game application, a media player application, a web browser application, a phone book application, or any combination thereof. The one or more external applications may comprise a calendar application, a game application, a media player application, a phone book application, or any combination thereof.

The above objects, advantages and features together with numerous other objects, advantages and features, which will become evident from below detailed description, are obtained according to a second aspect of the present invention by a communication terminal adapted to identify a pattern in a message and generating an action comprising:

(a) a pattern table comprising one or more patterns associated with a first application and a second application;
(b) a parser adapted to parse a message for said one or more patterns in said pattern table and adapted to generate a pattern list comprising one or more identified patterns identified in said message and said pattern table;
(c) an action generator adapted to identify a first parameter for said first application in said pattern list and adapted to generate an action comprising a first application call for said first application, which first application call comprising said first parameter and a second application call for said second application;
(d) a controller adapted to execute said action.

The action generator according to the second aspect of the present invention may further be adapted to identify a second parameter for said second application in the pattern list; and be adapted to assign a value to each of the first and/or second parameters. The identification of parameters eases generation of actions, and a user thereby experiences an intelligent communication terminal.

The action generator according to the second aspect of the present invention may further be adapted to assign a default value to the first and/or second parameter; and adapted to prompt a user of the communication terminal to assign a value to the first and/or second parameter. Patterns associated with applications may in specific instances require parameters in order to operate, which parameters are not immediately identifiable as patterns in the message. Hence user interaction is required in order to perform the associated application call, since the required parameters are not deducible from the message.

The action generator, according to the second aspect of the present invention, may be adapted to generate an action list of one or more actions each comprising an application call to an application associated with the one or more patterns in the pattern list. This is especially advantageous, since the contents of a message may associate to a plurality of possible actions.

The communication terminal according to the second aspect of the present invention may further comprise a user interface enabling a user to select the one or more of actions in the action list as the first application.

The communication terminal according to the second aspect of the present invention may further comprise a user interface enabling a user to select the one or more patterns in the pattern list as the first application. This gives the user an option to control the generation of an action, which may be advantageous in many situations.

The first and/or second application according to the second aspect of the present invention may further comprise a calendar application, a game application, a media player application, a web browser application and/or a phone book application, or any combination thereof. Obviously, the communication terminal may perform application calls to any type of application, that is, the list provided above may further comprise application calls to various facilitating applications such as editors, spreadsheets, presentation engines. Further, the communication terminal enables the combination of any of these applications in every possible way, that is, further enabling a combination of more than two applications.

The communication terminal according to the second aspect of the present invention may be a mobile or cellular phone, a personal digital assistant, a computer, or any combination thereof.

The communication terminal according to the second aspect of the present invention may further comprise a message handler adapted to handle short message services (SMS), multimedia message services (MMS), e-mail services, or any combination thereof.

These features will increase attractiveness of using the communication terminal. Further, features may be used without the end user knows them from the user manual. Another advantage is easier and more user-friendly handling of the communication terminal.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

In the following description of the various embodiments, reference is made to the accompanying drawings, which form a part hereof, and in which by way of illustration various embodiments are shown, in which the invention may be practiced. It is to be understood that other embodiments may be utilized, and structural and functional modifications may be made without departing from the scope of the present invention.

Figure 1:
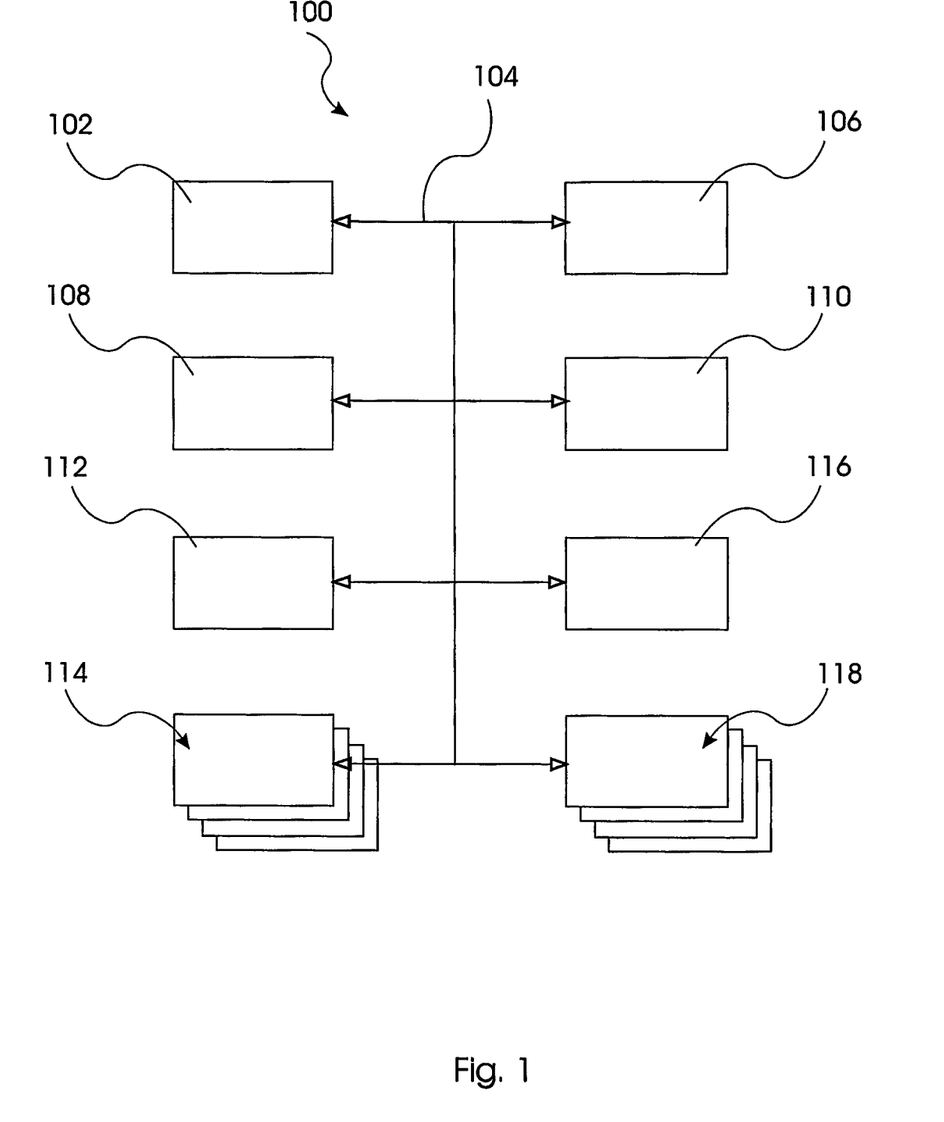
FIG. 1 shows a communication terminal according to a first embodiment of the present invention.

FIG. 1 shows a scheme of a communication terminal to a first embodiment of the present invention and designated in its entirety by reference numeral 100. The communication terminal 100 comprises a controller 102 connected through a connection 104 to a plurality of elements of the communication terminal 100.

The communication terminal 100 comprises a message handler 106, a parser 108, a pattern list 110, an action generator 112, one or more pattern tables 114 such as a static pattern table comprising predefined links between patterns and actions, activities and/or applications, and such as a dynamic pattern table comprising links between patterns and previously saved activities, e.g. a game, and/or links between new patterns identified and associated with actions, activities and/or applications.

The communication terminal further comprises a display 116 for presenting user interfaces and comprises one or more applications 118.

The message handler 106 is arranged to receive, send, store, and present messages to a user of the communication terminal 100. The message handler 106 is able to handle short message services (SMS), multimedia message services (MMS) and/or e-mail services. The messages are presented to the user through user interfaces (UI) such as will be described with reference to FIG. 2 to 4.

The parser 108 is arranged to parse a message received or to be sent by the message handler 106. The parser 108 compares patterns in the message with patterns in the one or more pattern tables 114. Matching patterns from the message are stored in the pattern list 110, and the controller presents the matching patterns to the user of the communication terminal 100 by marking matching patterns in received message through a user interface presented on the display 116, or simply by presenting the pattern list 110 through a user interface on the display 116.

The action generator 112 analyses patterns in the pattern list 110 to identify an executable action by addressing one or more applications 118 and assigning any parameters required by said one or more applications 118. The user of the communication terminal 100 is able to make one or more selections on which pattern and/or action through a user interface presented on the display 116.

The controller 102 executes the action identified by the action generator 112.

Figure 2:
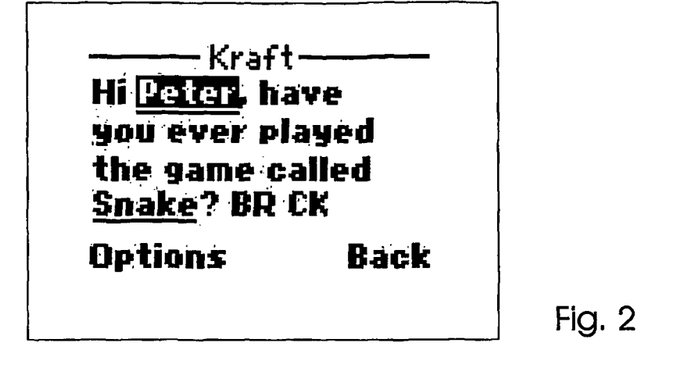
FIG. 2 shows an example of a first display view according to a first embodiment of the present invention.
Figure 3:
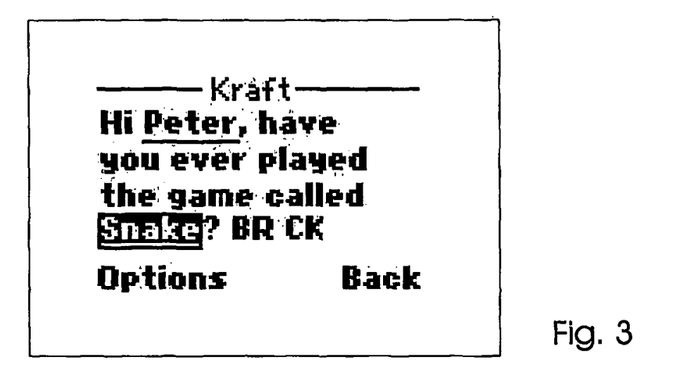
FIG. 3 shows an example of a second display view according to the first embodiment of the present invention.
Figure 4:
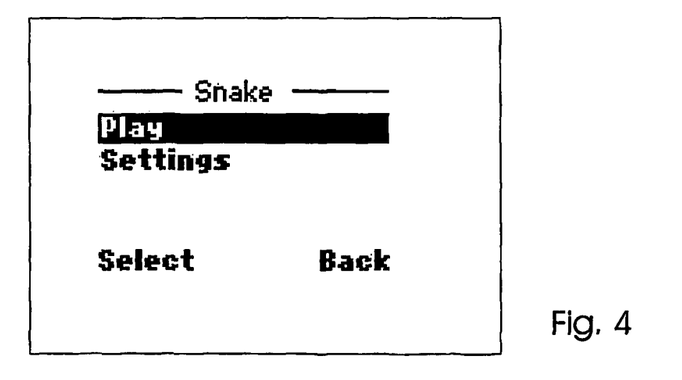
FIG. 4 shows an example of a third display view according to the first embodiment of the present invention.

FIG. 2 to 4 show an example user interfaces presented to a user according to a first embodiment of the present invention. A data item comprising at least one message part is opened, and the message is displayed to the user. The message is parsed by a means of a parser, which generates matched patterns in the message. The matched patterns are marked in the text by underlining. The user is enabled to set a marker on one of the marked patterns to make a selection. When selection is made, an analyser looks up possible actions associated with the marked pattern and displays them to the user. Execution of one of the possible actions is then done upon selection by the user.

Figure 5:
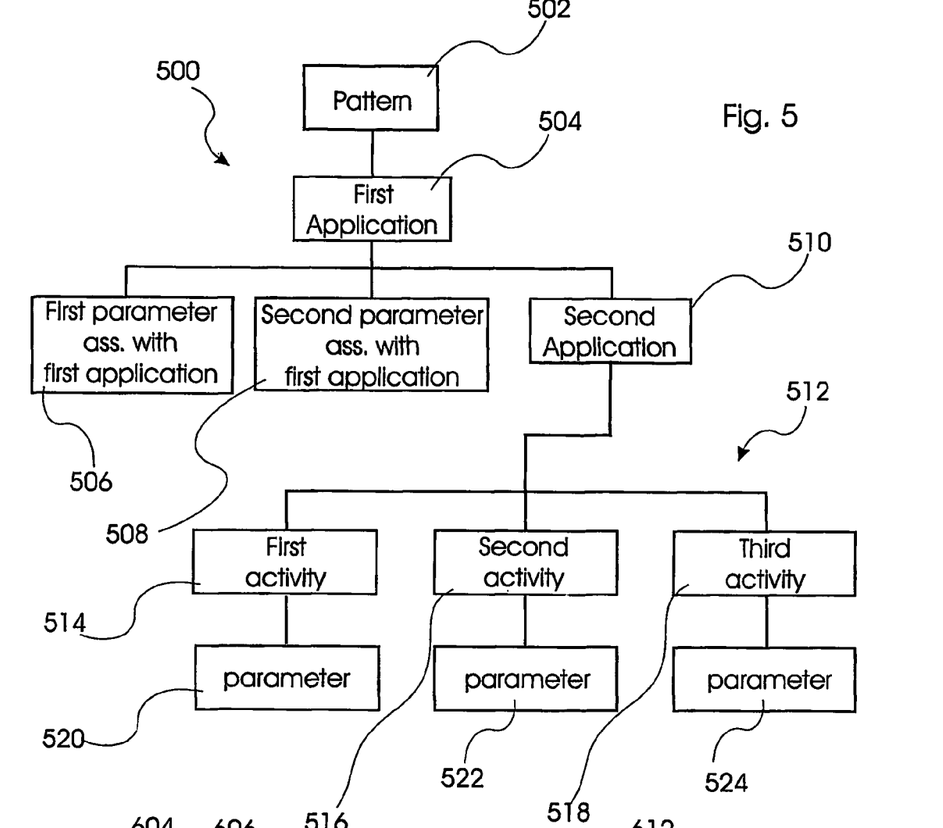
FIG. 5 shows a schematic diagram of a hierarchical model for generating an executable action according to the first embodiment of the present invention.

FIG. 5 shows a hierarchical generation of an executable action 500. A selected pattern 502 is associated with a first application 504, which is selected by a user. To generate an executable action 500, the selected application 504 needs a set of parameters comprising a first parameter 506 and a second parameter 508 associated with the application 504, and a second application 510 comprising a set of activities 512. The activities 512 comprise a first activity 514, a second activity 516, and a third activity 518, which need parameters 520, 522, and 524, respectively.

For example, the received message is an SMS with the text 'Hi Mate! Should we continue our chess game? What about 10:15 on 2003-03-17? BR N'. The selected pattern 502 is the word CHESS. The user selects the action 504 PLAY CHESS. When generating the executable action 500, the first parameter 506 is set to the date 2003-03-17, which is identified in the message, the second parameter 508 is set to the time 10:15, which also is identified in the message. The application 510 is set to be CALENDAR. The first activity 514 is set to the game application CHESS, and the parameter 520 associated to the game is set to RESUME OLD SESSION, since there was an ongoing game session. The second activity 516 is set to SMS because the game took place via Short Messaging Service over a telecommunication network such as a general packet radio services (GPRS). Therefore, the parameter 522 is set to GPRS. The third activity 518 is set to PHONEBOOK with parameter 524 set to NINA, since she was the sender of the message, and the user had an old ongoing game session with her. The executable action could then be denoted as: CALENDAR(2003-03-17, 10:15, CHESS(RESUME_OLD_ SESSION, SMS(GPRS, PHONEBOOK(NINA))))

Figure 6:
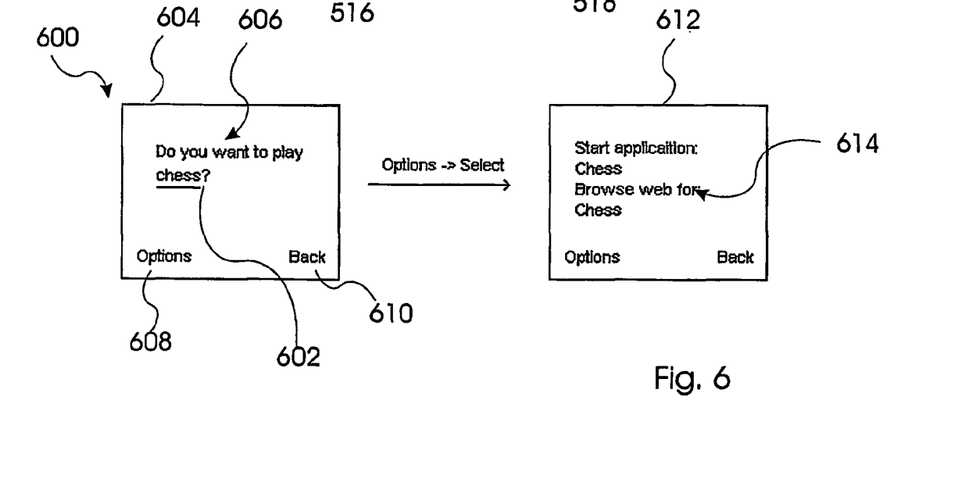
FIG. 6 shows a use case of a method according to the first embodiment of the present invention.

FIG. 6 shows further user interfaces of the communication terminal and the method according to the first and second embodiment of the present invention, which user interfaces are designated in entirety by reference numeral 600. The figure shows a matched pattern 602 identified and underlined in the first user interface 604 in a message 606. The user may choose between 'Options' 608 and 'Back' 610. By choosing 'Back' 610 no action is taken. By choosing 'Options' 608 a selection of the underlined pattern 602 is performed, and thus the user is shown a second user interface 612, where a one or more possible actions 614 are presented. In case the first user interface 604 presents more than one pattern, the user may scroll between the patterns so as to select a particular pattern and by choosing 'Options' 608 the user is presented with options relating to the selected particular pattern. These user interfaces show the feasibility of the invention, where the only step a user has to take is to select a pattern and an action.

Figure 7:
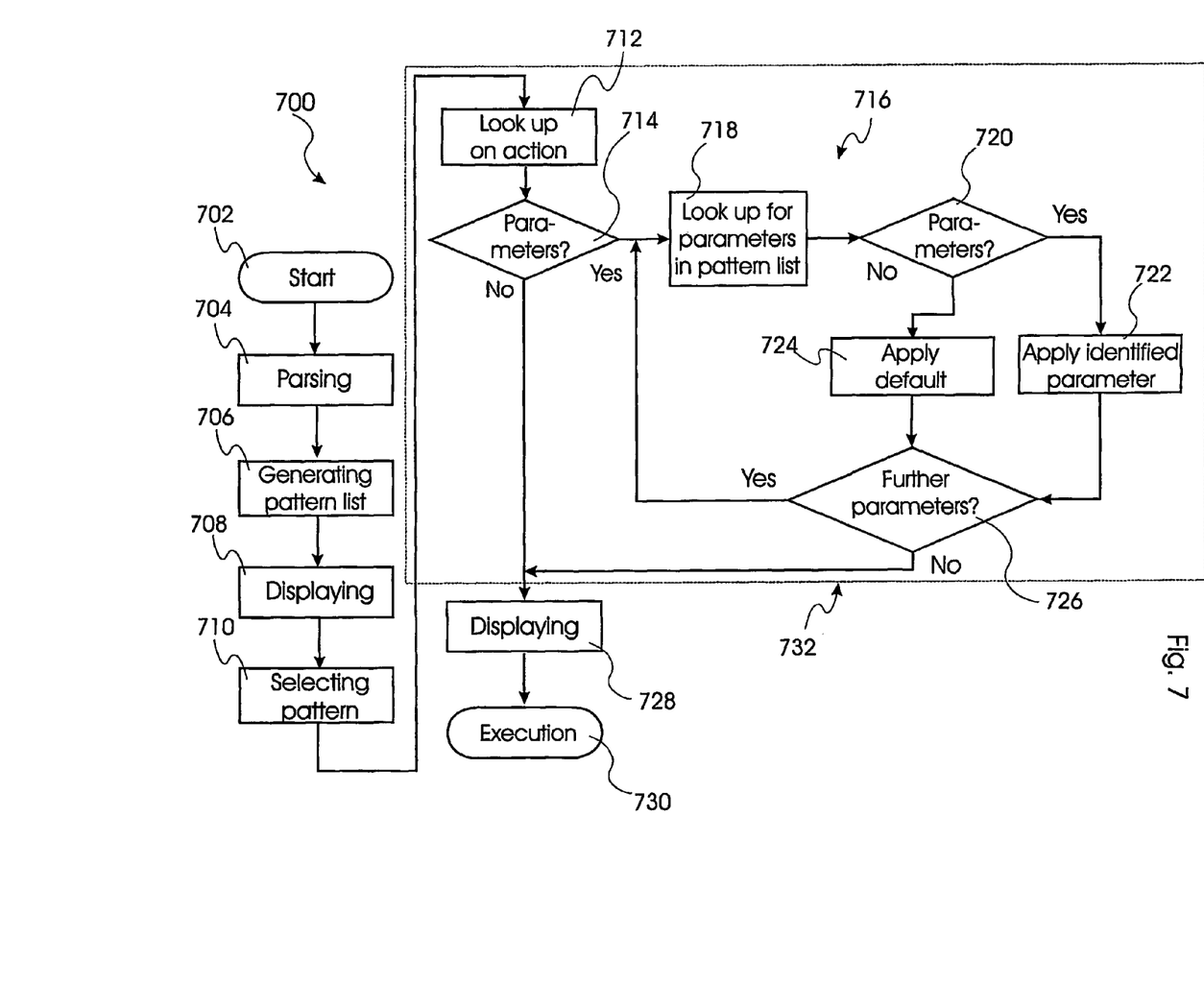
FIG. 7 shows a flow chart of the method according to the first embodiment of the present invention.

FIG. 7 shows a flow chart of a method for generating an executable action according to a first embodiment of the present invention and designated in its entirety by reference numeral 700. The method 700 comprises a start state 702, during which the method 700 initialises execution of program code. The method 700 further comprises parsing 704 a message to identify patterns in the message matching one or more predefined patterns associated with possible actions, applications and/or activities in a communication terminal such as a mobile or a cellular phone, a personal digital assistant, a computer, or any combination thereof.

A pattern may comprise a key word, key sound, key image, or any combination thereof. Key words to be identified may comprise names (words starting with a capitol letter), unique words or a unique constellation of symbols (i.e. words or symbol constellations a match in a communication terminal's word dictionary), all words beyond a predetermined length, words in a foreign language, or any combination thereof.

The matching patterns are stored by generating 706 a pattern list of identified patterns in the message. The method 700 further comprises displaying 708 identified patterns by marking them in the message, or displaying the generated pattern list. The method 700 further comprises selecting 710 a pattern from said pattern list, automatically or by means of a user, and performing a look up 712 on an action associated with said selected pattern.

Parameters for said selected action is checked during a first parameter check 714. As long as an action associated with a particular pattern requires a parameter, a parameter look-up loop 716 is continued. The pattern list is examined for further parameters during look-up 718, and during a second parameter check 720 the method 700 determines whether the selected action requires further parameters.

In case the second parameter check 720 returns a "Yes", the identified pattern is applied as a parameter for the selected action during a first application step 722. Alternatively, in case the second parameter check 720 returns a "No", a default parameter is applied for the selected action during a second application step 724 e.g. by setting a most likely parameter, or by prompting the user to set the parameter.

Finally, during a third parameter check 726 is performed so as to ensure that the required parameters have been set for the selected action.

The method 700 further comprises displaying 728 an executable action to the user, and executing 730 the executable action according to the associated parameter or parameters.

Elements of box 732 may be recursively repeated thereby possibly producing further actions.

Figure 8A:
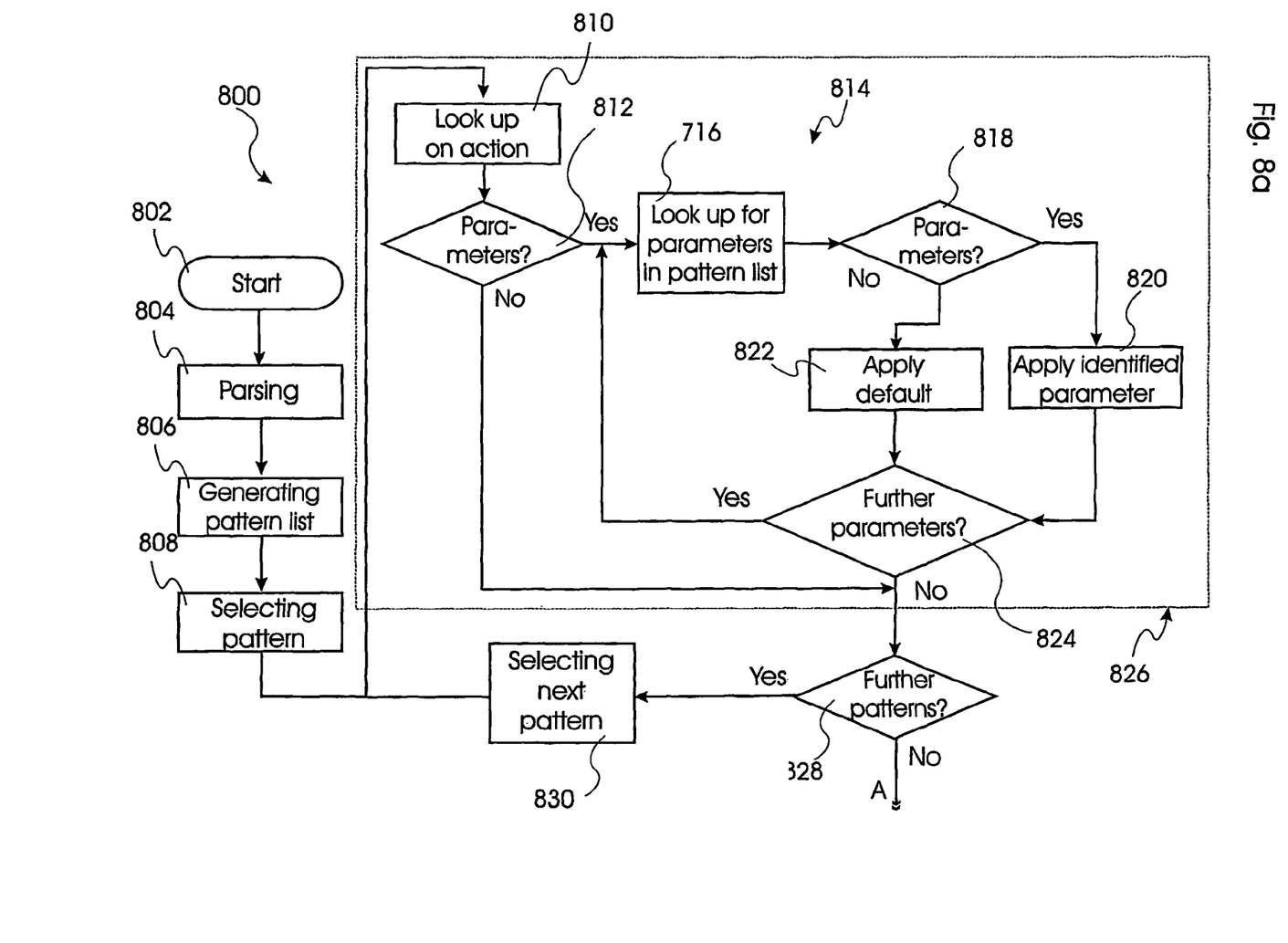
FIGS. 8*a* and 8*b* show a flow chart of a method according to a second embodiment of the present invention.
Figure 8B:
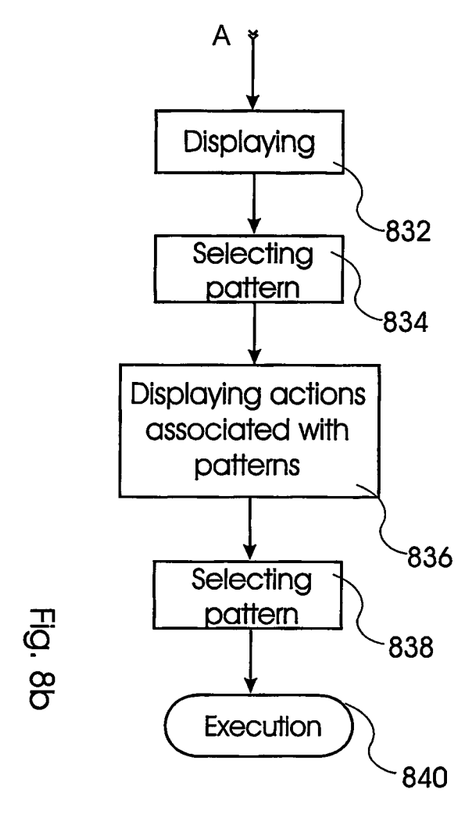

FIGS. 8a and 8b show a flow chart of a method for generating an executable action according to a second embodiment of the present invention and designated by its entirety by reference numeral 800. The method 800 comprises a start state 802, during which the method 800 for example initialises execution of program code. The method 800 further comprises parsing 804 a message to identify patterns in the message matching one or more predefined patterns associated with possible actions, applications and/or activities in a communication terminal.

The matched patterns are stored by generating 806 a pattern list. The method 800 further comprises selecting 808 a pattern from said pattern list, and looking up 810 on an action associated with said selected pattern. Whether the action requires any parameters is checked during a first parameter check 812. As long as an action associated with a particular pattern requires a parameter, a parameter look-up loop 814 is continued.

The parameter look-up loop 814 comprises, as described above with reference to FIG. 7, a look-up 816, a second parameter check 818 a first application step 820 entered in case the second parameter check 818 returns a "Yes", a second application step 822 in case the second parameter check 818 returns a "No", and a third parameter check 824.

Parameters are set by performing the look up 816 for parameters in said pattern list, and identified parameters are applied during either the first or second application step 820 or 822, respectively. If a needed parameter is missing in said pattern list, the parameter is set by applying parameters in a default way 826, e.g. by setting a most likely parameter, or by prompting the user to set the parameter.

As described above with reference to FIG. 7 the elements of box 826 may be recursively repeated thereby possibly producing further actions.

When all the required parameters associated with the first action have been identified and applied to the action, the method 800 continues to perform a further pattern check 828, during which the pattern list is examined to establish whether all the patterns in the pattern list have been associated with an action or with a parameter for an action. In case the further pattern check 828 returns a "Yes", the method 800 selects the next non-associated pattern 830.

In case the further pattern check 828 returns a "No", the method 800 ends at point "A" in FIG. 8a and continues in point "A" in FIG. 8b and displays 832 the patterns associated to an action in the message. The patterns may be shown in the message, for example by highlighting or underlining, or displaying the pattern list. Following the displaying 832, the method 800 enables a selection 834 of a pattern displayed, and by selecting a particular pattern from the possible patterns in the message associated with actions, the actions associated with the particular pattern is displayed 836. The method 800 now enables selecting the particular pattern 838 and executing 840 the action associated to the particular pattern.

Hence the user of for example a communication terminal is then able to select a pattern upon the information about the associated executable action.

Naturally, there are many ways, in which the message can be analysed, and with which pattern it should start. A way of organizing this is to apply a priority scheme for automatically choosing between patterns to start with or to include in the action build-up.

There are also many alternatives as to how to associate patterns to each other, and many conflicts are possible. Therefore, it is advantageous to present a list of options to the user to choose from. This list contains different possible actions for a pattern and for combinations of patterns in a message. For example, the word CHESS could list the possibilities to play chess on the terminal, go to the web-site of the musical called Chess if it is stored as a favorite bookmark, and search the web for the word CHESS.

It is not necessary in all situations to ask the user before executing the action. Therefore, the execution is made based on an execution parameter which is pre-defined, defined in the received message or defined by the user, or any combination thereof.

The invention claimed is:

1. A method comprising:
   parsing a message for keyword patterns;
   comparing said keyword patterns with patterns in a pattern table to identify two or more matched patterns, matched patterns being patterns that are present in said message and in said pattern table;
   generating a pattern list of said matched two or more patterns;
   enabling a user to select one of said one or more identified patterns in said message as a first matched pattern;
   associating said first matched pattern in said pattern list with a first application;
   associating a second matched pattern in said pattern list with a second application, wherein the first application is distinct from the second application;
   identifying a first parameter for said first application in said pattern list;

identifying a second parameter for said second application in said pattern list;
generating an action comprising:
   a first application call for said first application, wherein said first application call comprises said first parameter; and
   a second application call for said second application, wherein said second application call comprises said second parameter; and
executing said action.

2. A method according to claim 1, further comprising:
generating further actions from said one or more patterns in said message;
causing said actions to be displayed to a user; and
enabling said user to select among said action and said further actions.

3. A method according to claim 1, further comprising:
at least one of assigning a default value to at least one of the first or the second parameter; or prompting a user of said communication terminal to assign a value to said at least one of the first or the second parameter.

4. A method according to claim 1, wherein said action comprises at least one of one or more application calls for internal applications or one or more application calls for external applications.

5. A method according to claim 4, wherein said one or more internal and external applications comprise at least one of a calendar application, a game application, a media player application, a phone book application, or any combination thereof; or wherein said one or more internal applications further comprise a web browser application.

6. An communication terminal comprising a controller and a storage including program code, the storage and the program code configured to, with the controller, cause the communication terminal to at least:
parse a message for keyword patterns;
compare said keyword patterns with patterns in said pattern table to identify two or more matched patterns, matched patterns being patterns that are present in said message and in said pattern table;
generate a pattern list of said matched two or more patterns;
enable a user to select one of said one or more identified patterns in said message as a first matched pattern;
associate said first matched pattern in said pattern list with a first application;
associate a second matched pattern in said pattern list with a second application, wherein the first application is distinct from the second application;
identify a first parameter for said first application in said pattern list;
identify a second parameter for said second application in said pattern list; and
generate an action comprising:
   a first application call for said first application, wherein said first application call comprises said first parameter; and
   a second application call for said second application, wherein said second application call comprises said second parameter; and
execute said action.

7. A communication terminal according to claim 6, wherein the storage and the program code are further configured to, with the controller, cause the communication terminal to assign a value to at least one of the first or second parameter.

8. A communication terminal according to claim 6, wherein the storage and the program code are further configured to, with the controller, cause the communication terminal to assign a default value to at least one of the first or second parameter; and to cause a user of said communication terminal to be prompted to assign a value to at least one of the first or second parameter.

9. A communication terminal according to claim 6, wherein the at least one of the first or second application comprises at least one of a calendar application, a game application, a media player application, a web browser application, a phone book application, or any combination thereof.

10. A communication terminal according to claim 6, wherein said communication terminal is a mobile or a cellular phone, a personal digital assistant, a computer, or any combination thereof.

11. A according to claim 6 wherein the storage and the program code are further configured to, with the controller, cause the communication terminal to handle short message services (SMS), multimedia message services (MMS), e-mail services, or any combination thereof.

12. A communication terminal according to claim 6, wherein the storage and the program code are further configured to, with the controller, cause the communication terminal to generate an action list of one or more actions each comprising an application call to an application associated with said one or more patterns in said pattern list.

13. A communication terminal according to claim 12 wherein the storage and the program code are further configured to, with the controller, cause the communication terminal to enable a user to select said one or more of actions in said action list as said first application.

14. A non-transitory computer readable medium having stored therein computer code that when executed by an apparatus comprising a controller and a storage causes the apparatus to at least:
parse a message for keyword patterns;
compare said keyword patterns with patterns in said pattern table to identify two or more matched patterns, matched patterns being patterns that are present in said message and in said pattern table;
generate a pattern list of said matched two or more patterns;
enable a user to select one of said one or more identified patterns in said message as a first matched pattern;
associate said first matched pattern in said pattern list with a first application;
associate a second matched pattern in said pattern list with a second application, wherein the first application is distinct from the second application;
identify a first parameter for said first application in said pattern list;
identify a second parameter for said second application in said pattern list; and
generate an action comprising a first application call for said first application, wherein said first application call comprises said first parameter and a second application call for said second application, wherein said second application call comprises said second parameter; and
execute said action.

15. The non-transitory computer readable medium according to claim 14 having stored therein computer code that when executed by an apparatus further causes the apparatus to at least: generate further actions from said one or more patterns in said message; cause said actions to be displayed to a user; and enable said user to select among said action and said further actions.

16. The non-transitory computer readable medium according to claim 14 having stored therein computer code that when executed by an apparatus further causes the apparatus to at least one of: assign a default value to at least one of the first or the second parameter; or prompt a user of said communication terminal to assign a value to said at least one of the first or the second parameter.

17. The non-transitory computer readable medium according to claim 14 having at least one of one or more application calls for internal applications or one or more application calls for external applications.

18. The non-transitory computer readable medium according to claim 17, wherein said one or more internal and external applications comprise at least one of a calendar application, a game application, a media player application, a phone book application, or any combination thereof; or wherein said one or more internal applications further comprise a web browser application.

\* \* \* \* \*

UNITED STATES PATENT AND TRADEMARK OFFICE
CERTIFICATE OF CORRECTION

PATENT NO.        : 8,615,546 B2
APPLICATION NO.   : 10/544594
DATED             : December 24, 2013
INVENTOR(S)       : Peter Dam Nielsen et al.

Page 1 of 1

It is certified that error appears in the above-identified patent and that said Letters Patent is hereby corrected as shown below:

In the Claims

Column 9,
Line 32, claim 6, "An communication terminal" should read --A communication terminal--.

Column 10,
Line 7, claim 9, "wherein the at least one" should read --wherein at least one--;
Line 15, claim 11, "A according" should read --A communication terminal according--.

Signed and Sealed this
Thirteenth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,615,546 B2  Page 1 of 1
APPLICATION NO. : 10/544594
DATED : December 24, 2013
INVENTOR(S) : Nielsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1766 days.

Signed and Sealed this

Twenty-second Day of September, 2015

Michelle K. Lee
*Director of the United States Patent and Trademark Office*